United States Patent
Cho et al.

(10) Patent No.: US 7,259,664 B1
(45) Date of Patent: Aug. 21, 2007

(54) SENSORLESS FUEL LEVEL AND OIL CHANGE INDICATORS

(76) Inventors: Chahee Peter Cho, 2519 Long Meadow Rd., Lansdale, PA (US) 19446; Eun Shik Kim, 5360 Sequoia Farms Dr., Centreville, VA (US) 20120

( * ) Notice: Subject to any disclaimer, the term of this patent is extended or adjusted under 35 U.S.C. 154(b) by 79 days.

(21) Appl. No.: 10/868,349

(22) Filed: Jun. 16, 2004

(51) Int. Cl.
*B60Q 1/00* (2006.01)

(52) U.S. Cl. .............. 340/450.2; 180/65.2; 340/450.3; 701/22

(58) Field of Classification Search ............. 340/450.2, 340/450.3, 450, 457, 457.4, 438, 425.5, 461; 318/139; 290/40 R; 180/65.2; 701/22
See application file for complete search history.

(56) References Cited

U.S. PATENT DOCUMENTS

| | | | | |
|---|---|---|---|---|
| 4,007,629 A | * | 2/1977 | Hochstein | ............ 73/53.05 |
| 4,933,852 A | * | 6/1990 | Lemelson | ............ 701/30 |
| 5,313,191 A | * | 5/1994 | Yamashita et al. | .......... 340/439 |
| 6,333,620 B1 | | 12/2001 | Schmitz et al. | |
| 6,463,967 B1 | * | 10/2002 | Boyle | .......... 141/94 |
| 6,622,804 B2 | * | 9/2003 | Schmitz et al. | ............ 180/65.2 |
| 2003/0065570 A1 | * | 4/2003 | Fukushima et al. | ........... 705/22 |
| 2004/0013928 A1 | * | 1/2004 | Yamauchi et al. | ............. 429/34 |
| 2005/0200463 A1 | * | 9/2005 | Situ et al. | ................... 340/438 |

* cited by examiner

*Primary Examiner*—Brent A. Swarthout
(74) *Attorney, Agent, or Firm*—Proskauer Rose LLP (57) ABSTRACT

Sensorless fuel level and oil change indicators are provided in a range extender for an electric vehicle. The range extender includes an engine, and an electric generating device driven by the engine to generate electric power supplied to the vehicle. The fuel level is calculated based on the generated power. The oil change indicator indicates that the oil should be changed when the number of engine rotor revolutions exceeds a threshold value. The electric generating device may be a dynamoelectric machine coupled to the engine by a shaft to operate as a motor for starting the engine. In response to prescribed engine conditions, the dynamoelectric machine is switched to operate as a generator driven by the engine to generate the electric energy.

101 Claims, 5 Drawing Sheets

| Generated power (kW) | Efficiency (%) |
|---|---|
| 0.5 | 80 |
| 1.0 | 82 |
| 1.5 | 84 |
| 2.0 | 86 |
| 8.0 | 95 |
| 10.0 | 90 |
| 15 | 75 |

FIG. 4

| Engine Speed(RPM) | Efficiency (%) vs Engine Temp ||||||
|---|---|---|---|---|---|---|
| | -10 °C | 0 °C | 10 °C | ... 70 °C | ... 100 °C | ... |
| 700 | 40 | 42 | 45 | 50 | 55 | |
| 800 | 45 | 47 | 50 | 57 | 60 | |
| 900 | 50 | 53 | 55 | 60 | 67 | |
| 1000 | 55 | 58 | 62 | 66 | 70 | |
| 2000 | 60 | 62 | 66 | 69 | 74 | |
| 3000 | 57 | 60 | 63 | 67 | 70 | |
| 4000 | 40 | 42 | 43 | 49 | 52 | |

SENSORLESS FUEL LEVEL AND OIL CHANGE INDICATORS

FIELD OF THE INVENTION

The present invention relates to maintenance indicators for determining a fuel level and when engine oil should be changed in motor vehicles, and, more particularly, to indication of fuel level and oil change without sensors that detect a level of fuel and engine oil condition.

BACKGROUND ART

Traditionally, maintenance indicators in a vehicle utilize sensors for indicating operating parameters relating to materials required to operate the engine. For example, a fuel level in automobile fuel tanks is determined using a fuel level sensor having an elongated rod with a free end supporting a float which moves along with changes in fuel levels. The other end of the rod is pivotally mounted to an indicating mechanism typically including an elongated electrical resistance grid and a contact pad which moves with movements of the float and the rod as the fuel level changes. The movement of the contact pad along the resistance grid changes electrical characteristics of the indicating mechanism providing a variable input to a fuel indicator gauge located within a passenger compartment of a vehicle.

However, in a moving vehicle, fuel level values measured by fuel level sensors may be inaccurate due to driving conditions, such as acceleration or deceleration causing the fuel sloshing movement, or uphill and downhill driving. The need thus exists for a sensorless fuel level indicator able to determine a fuel level regardless of driving conditions.

Typical engine oil change indicators produce indications that engine oil should be changed based on measurements carried out by a combination of sensors for detecting various oil parameters, such as pressure, temperature, transparence, resistivity, etc. However, these indicators are complicated and costly. Therefore, it would be desirable to provide an oil change indicator that does not require an expansive sensing arrangement for detecting engine oil parameters.

DISCLOSURE OF THE INVENTION

The present invention provides novel sensorless indicators in a range extender for an electric vehicle. The range extender includes an engine, an electric generating device driven by the engine to generate electric power supplied to the vehicle, and a sensorless indicator for indicating operating parameters relating to material required to operate the engine without sensing the material.

In accordance with one aspect of the invention, the sensorless indicator may indicate a level of fuel supplied to the engine without sensing the fuel level.

In accordance with another aspect of the invention, the sensorless indicator may indicate when an engine oil should be changed without sensing properties of the engine oil.

In accordance with an embodiment of the invention, the fuel level may be determined by calculating fuel amount consumed by the engine. The consumed fuel amount may be calculated based on the input power of the engine, which may be determined based on the output power of the engine. The output power of the engine is determined based on power generated by the electric generating device, which may be calculated based on voltage and current generated by the electric generating device.

In particular, the input power of the engine may be calculated as a ratio of the output power and the engine efficiency determined for a particular combination of engine temperature and engine speed. The output power of the engine may be calculated as a ratio of the power generated by the electric generating device and the generator efficiency determined for a particular value of the power generated by the electric generating device.

In accordance with an embodiment of the invention, while the sensorless oil change indicator indicates that the oil should be changed when number of engine rotor revolutions exceeds a first threshold value, it provides preliminary warning that the oil should be changed soon when the number of engine rotor revolutions exceeds a second threshold value lower than the first threshold value.

The electric generating device may be a dynamoelectric machine coupled to the engine by a shaft. The dynamoelectric machine may operate as a motor for starting the engine. In response to prescribed engine conditions, the dynamoelectric machine may be switched to operate as a generator driven by the engine to generate the electric energy.

In accordance with a further aspect of the invention, a vehicle having an electric traction motor and an engine comprises an electric generating device for generating electric power to supply the electric traction motor, and a sensorless fuel level indicator for determining a level of fuel supplied to the engine based on power generated by the electric generating device. The vehicle further may comprise an oil change indicator configured to operate without sensing properties of the oil.

The vehicle may include a dynamoelectric machine coupled to the engine to generate electric energy supplied to the vehicle. The dynamoelectric machine may be configured to operate as a motor for starting the engine. In response to prescribed engine conditions, the dynamoelectric machine is switched to operate as a generator driven by the engine to generate the electric energy.

In accordance with a further aspect of the invention, a method is provided for determining a level of fuel supplied to an engine for driving an electric generator. The method involves (a) driving the generator by the engine, and (b) determining operating parameters relating to material required to operate the engine without sensing the material. The step (b) may include determining a level of fuel supplied to the engine, and/or determining when engine oil should be changed.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
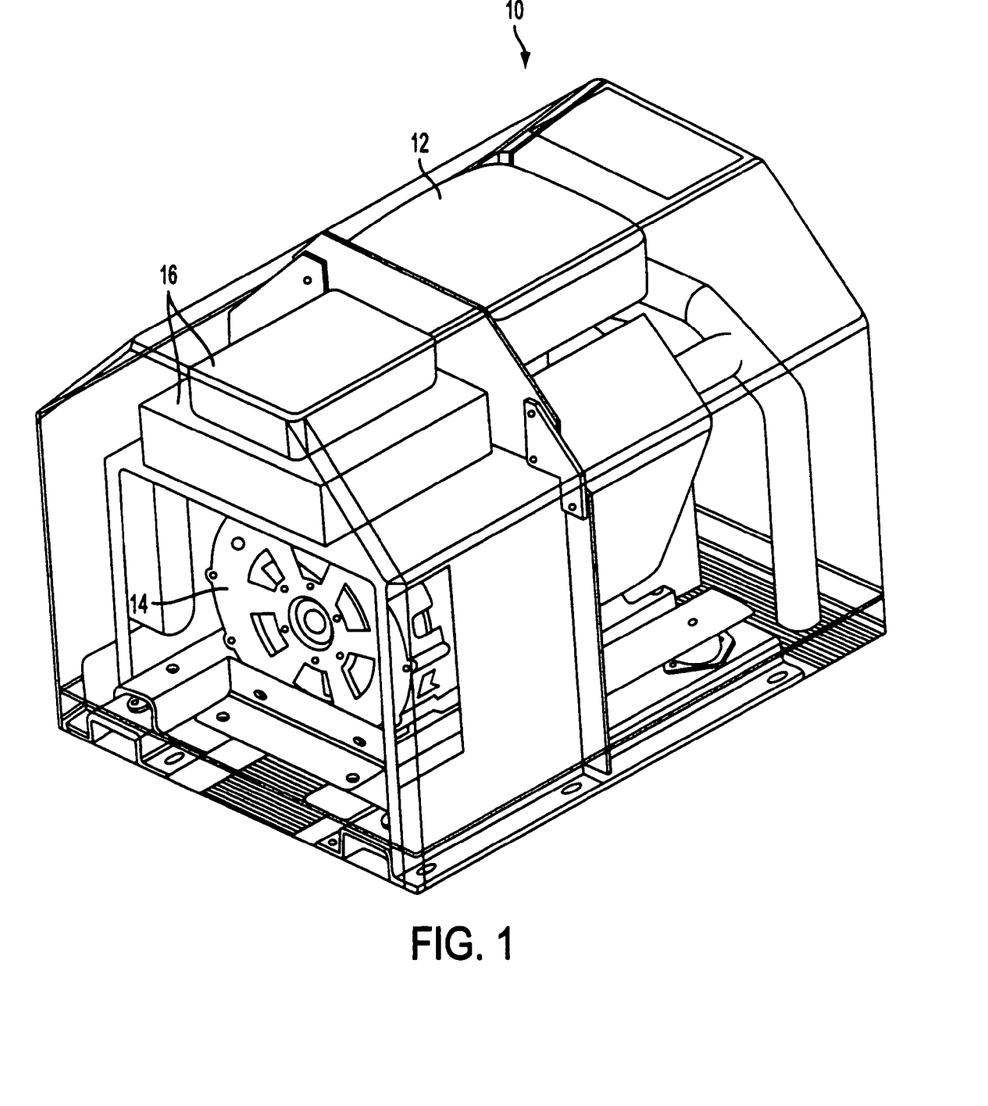
FIG. 1 shows a configuration of the portable range extender of the present invention.

FIG. 1 illustrates a range extender 10, in which sensorless fuel level and oil change indicators of the present invention may be advantageously employed. The range extender 10 comprises a prime mover 12, such as an internal combustion engine, a dynamoelectric machine 14 coupled to the prime mover 12 by a hollow shaft of the dynamoelectric machine 14, and an electronic control system 16 for controlling operations of the prime mover 12 and the dynamoelectric machine 14. The dynamoelectric machine 14 is controlled to operate as a motor for starting the engine 12 when the engine 12 is turned on. When prescribed engine conditions are detected, the control system 16 controls the dynamoelectric machine 14 to operate as an electric generator driven by the engine 12 to produce electric power supplied to an external load, such as an all-electric vehicle. The dynamoelectric machine 14 may be a 3-phase AC electric machine including a stator with a shaft, a rotor and a housing. A fuel contained in a fuel tank of the range extender is supplied to the engine 12 to support its operation.

Dynamoelectric machine 14 not only eliminates the need for a starter motor, but the bulk of the device renders a separate flywheel unnecessary. Thus, the range extender 10 may be packaged in a compact integrated assembly covered by an enclosure. This compact structure enables a user to place the portable range extender into any battery-powered vehicle in order to extend its travel range by charging its battery or driving the vehicle instead of or in combination with the electric motor. For example, the range extender 10 may be placed in all-electric buses or vans to enable their use for longer trips. Also, the range extender 10 may be mounted in a trailer carried by an all-electric vehicle.

Moreover, sensorless fuel level and oil change indicators of the present invention may be utilized with a range extender, which is an integral part of a hybrid electric vehicle provided to improve its travel range. For example, U.S. Pat. Nos. 6,622,804 and 6,333,620 describe a series type hybrid electric vehicle including electric motors powered by a battery array, vehicle control unit, an internal combustion engine and a generator driven by the internal combustion engine for charging the battery array. The internal combustion engine is controlled by the vehicle control unit to run continuously during operation of the vehicle. The charging of the battery array by the generator is controlled by the vehicle control unit depending on a driving mode of the vehicle, i.e., in accordance with power output, power consumption and rpm of the electric motors. The power generated by the generator is generally maintained constant but may be decreased if the state-of-charge of the battery array approaches an upper control limit at which the battery array may be overcharged, and may be increased if the state-of-charge approaches a lower control limit at which the battery array would be unable to drive the electric motors with enough torque to propel the vehicle.

In addition to the travel range extension applications, the sensorless fuel level and oil change indicators of the present invention may be employed in electric power sources for providing electric power to loads with substantial power consumption. For example, they may be utilized in auxiliary power units for such loads as trucks, recreational vehicles, etc.

Figure 2:
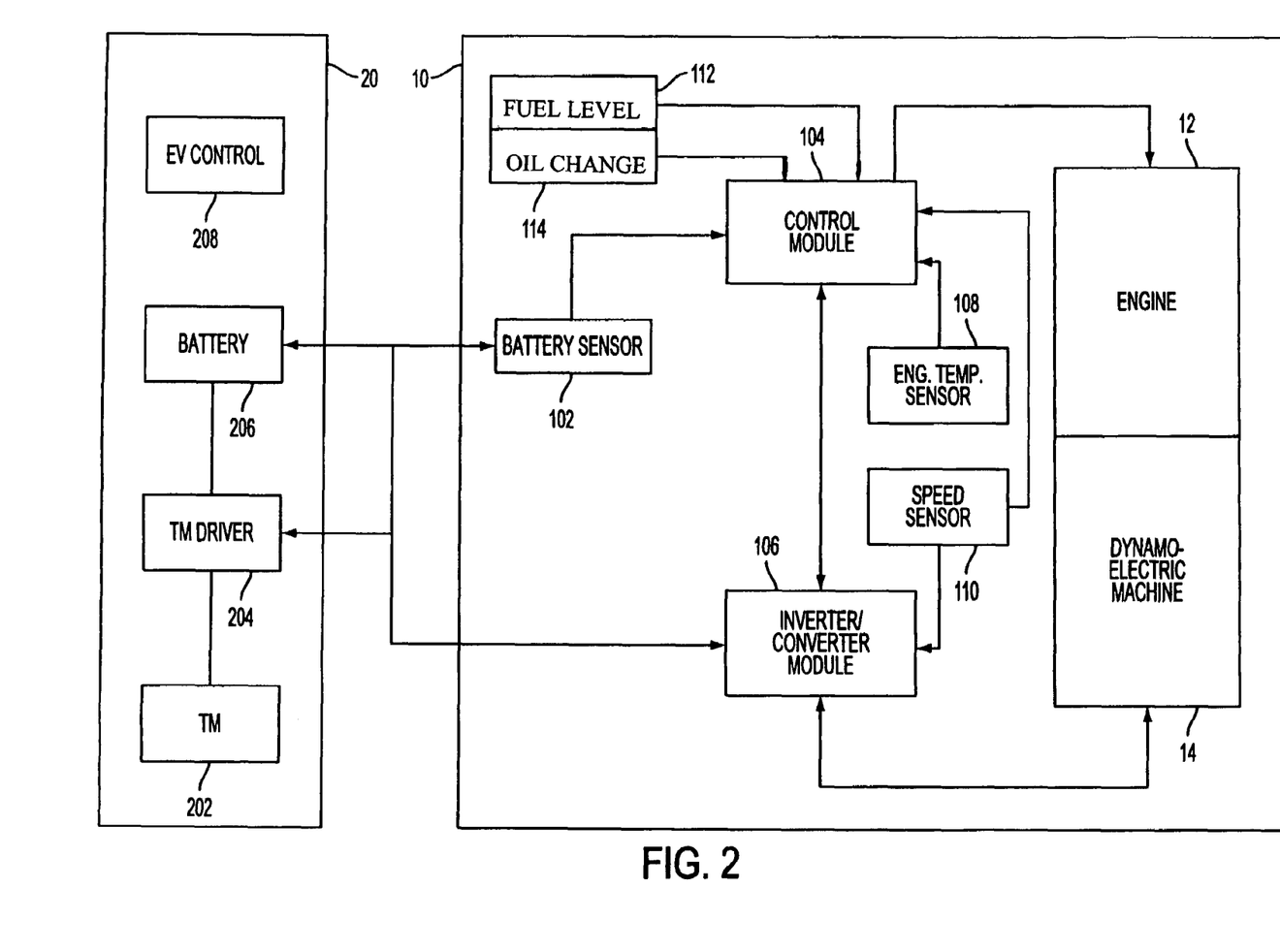
FIG. 2 is a block diagram of the range extender including sensorless fuel level and oil change indication systems of the present invention.

FIG. 2 is a block diagram of an exemplary embodiment of the present invention, in which the range extender 10 is detachably connectable to a battery-powered vehicle 20 having a traction electric motor (TM) 202 driven by a TM driver 204 and powered by an electric battery 206. The traction motor 202 may be a permanent magnet DC brushless motor energized by the high-voltage battery 206 that can provide substantial electric power, for example, about 65 KW. Also, the vehicle 20 may include an electric vehicle (EV) controller 208 for controlling operations of the vehicle 20. In response to a torque request, the EV controller 208 may control the TM driver 202 to provide sufficient electric power from the battery 206 to the motor 202 to achieve the desired torque. Also, the EV controller may control the motor 202 to act as an electric generator charging the battery 206 during a regeneration mode.

The range extender 10 may have a battery voltage sensor 102 detachably connectable to the vehicle 20 for sensing the voltage of the battery 206. When the voltage at the battery 206 is less than a predetermined minimum threshold value, the range extender may be activated automatically to charge the battery 206. The electronic control system 16 includes a control module 104 and an inverter/converter module 106. The control module 104 is supplied with signals representing parameters of the engine 12 and the dynamoelectric machine 14, such as an engine temperature signal provided by an engine temperature sensor 108 to indicate the temperature of the engine 12, and an engine/machine speed signal provided by a speed sensor 110 to indicate the rotational speed of the engine 12 and the dynamoelectric machine 14 coupled to the engine 12 by a shaft. The control module 104 may be implemented as a microcontroller programmable to control operations of the range extender 10.

As discussed in more detail below, in accordance with an embodiment of the present invention, the control module 104 comprises a sensorless fuel level indication system that calculates operating parameters required to determine a level of fuel contained in a fuel tank of the range extender 10 and supplied to the engine 12, and a sensorless oil change indication system that determines when the oil used in the engine 12 should be changed. A sensorless fuel level indicator 112 is controlled by the control module 104 to indicate a fuel level in the fuel tank of the range extender 10. Also, the control module 104 may control a sensorless oil change indicator 114 to indicate when the engine oil should be changed. The fuel level indicator 112 and oil change indicator 114 may be arranged outside of the range extender 10 at any location convenient for a user. The control module 104 may be implemented as a microcontroller programmable to perform operations required to carry out sensorless fuel level indication and/or sensorless oil change indication.

The inverter/converter module 106 controlled by the control module 104 is detachably connectable to the vehicle 20 to provide a bi-directional pass for transferring power either from the battery 206 to the dynamoelectric machine 14 operating in the motoring mode to initiate operation of the engine 12, or from the dynamoelectric machine 14 operating in the generating mode to the battery 206. In particular, the inverter/converter module 106 operates as an inverter to convert DC power from the battery 206 into 3-phase AC power for rotating the dynamoelectric machine 14 in the motoring mode, or as a converter for converting 3-phase AC power generated by the dynamoelectric machine in the generating mode into DC power used for charging the battery 206 or driving the traction motor 202. The control module 104 controls switching the inverter/converter module 106 between the inverter mode and the converter mode.

Figure 3:
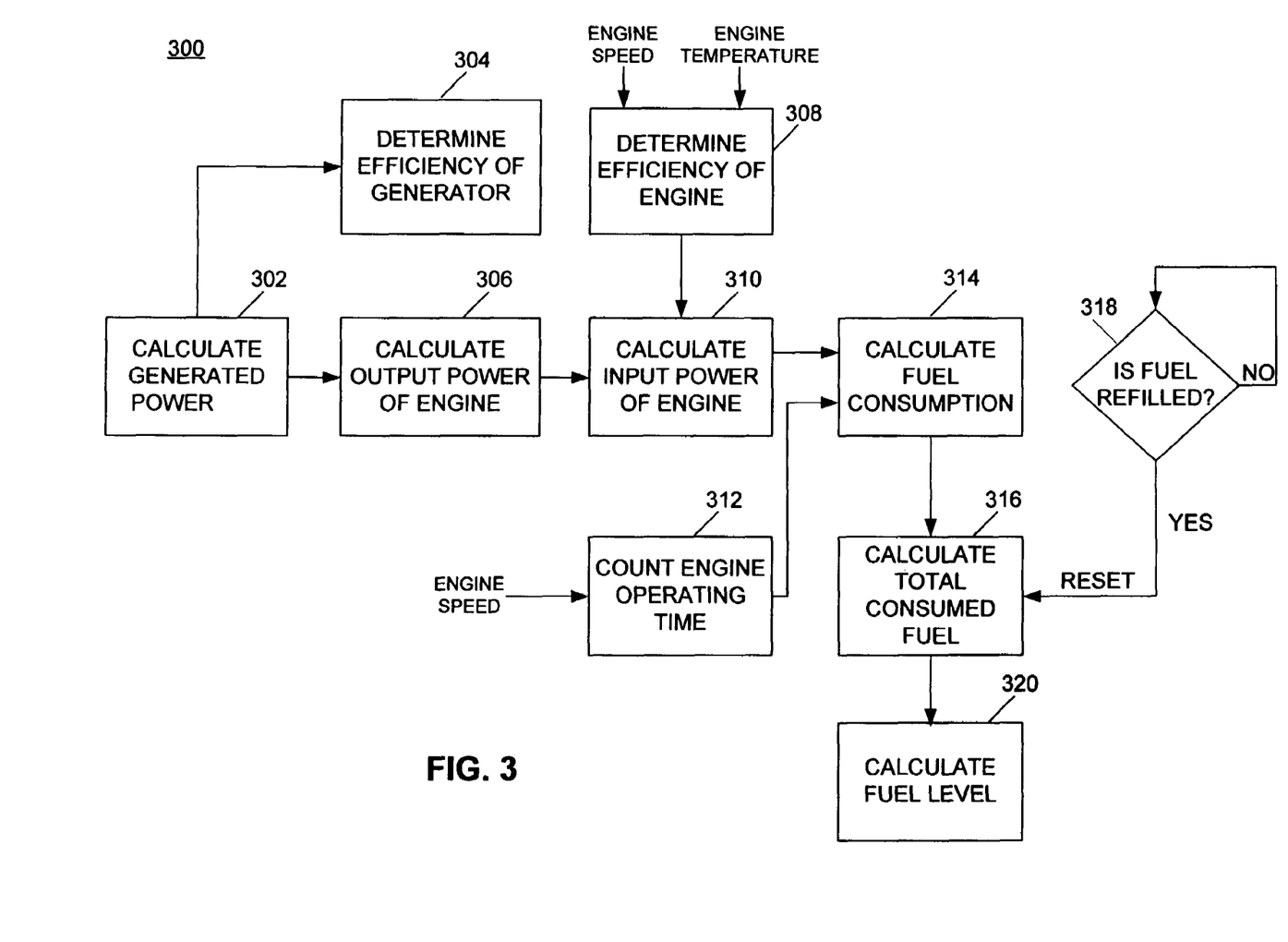
FIG. 3 is a flowchart illustrating operations of the sensorless fuel level indication system of the present invention.

FIG. 3 is a simplified flow chart schematically illustrating an embodiment of a sensorless fuel level indication system 300 in accordance with the present invention. As indicated above, the operations of the sensorless fuel level indication system 300 required to determine a level of fuel in a fuel tank may be carried out by the control module 104. The dynamoelectric machine 14 is controlled to operate as an electric generator driven by the engine 12 to produce electric power supplied to an external load. Hence, the fuel supplied to the engine 12 is used for generating electric power by the electric generator. Therefore, the fuel indication system 300 of the present invention determines a fuel level based on the fuel amount consumed by the engine 12 to enable the dynamoelectric machine 14 to produce the electric power generated in a generating mode.

In step 302, the sensorless fuel level indication system 300 determines a value of power generated by the dynamoelectric machine 14 in a generating mode. For example, the value of generated power Pg may be calculated as:

$$Pg = Ig \times Ug,$$

where Ig is a value of current generated by the dynamoelectric machine in a generating mode, and Ug is a value of voltage generated by the dynamoelectric machine in a generating mode. The Ig and Ug values may be determined, for example, using respective current and voltage sensors.

In step 304, the sensorless fuel level indication system 300 determines the efficiency Eg of the dynamoelectric machine 14 in a generating mode. The generator efficiency Eg may be determined using a generator efficiency look-up table containing predetermined values of the generator efficiency Eg expressed in percents for various values of the generated power Pg.

Figure 4:
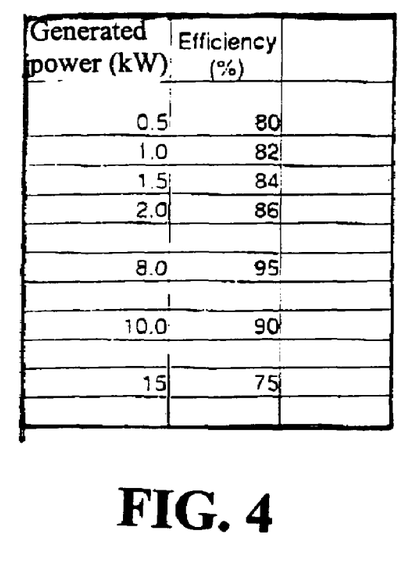
FIG. 4 illustrates an exemplary generator efficiency look-up table.

FIG. 4 shows an exemplary generator efficiency look-up table for values of the generated power from 0.5 to 15 kW. For example, for the generated power Pg of 0.5 kW, the generator efficiency Eg may be equal to 80%, for the generated power of 8.0 kW, the generator efficiency Eg may reach 95%, and for the generated power of 15 kW, the generator efficiency Eg may be equal to 75%. Based on the value of generated power Pg calculated in step 302, the indication system 300 accesses the generator efficiency look-up table to determine the respective value of the generator efficiency Eg. For example, the generator efficiency look-up table may be stored in a memory associated with the control module 104.

In step 306, the sensorless fuel level indication system 300 determines the output power Po of the engine 12. For example, the value of the output power Po may be calculated as:

$$Po = \frac{Pg \times 100}{Eg}.$$

In step 308, the indication system 300 determines the efficiency Ee of the engine 12. For example, the engine efficiency may be determined using an engine efficiency look-up table containing predetermined values of the engine efficiency in percents for various combinations of engine speed and engine temperature. The current values of the engine speed and engine temperature may be provided by the speed sensor 110 and engine temperature sensor 108.

Figure 5:
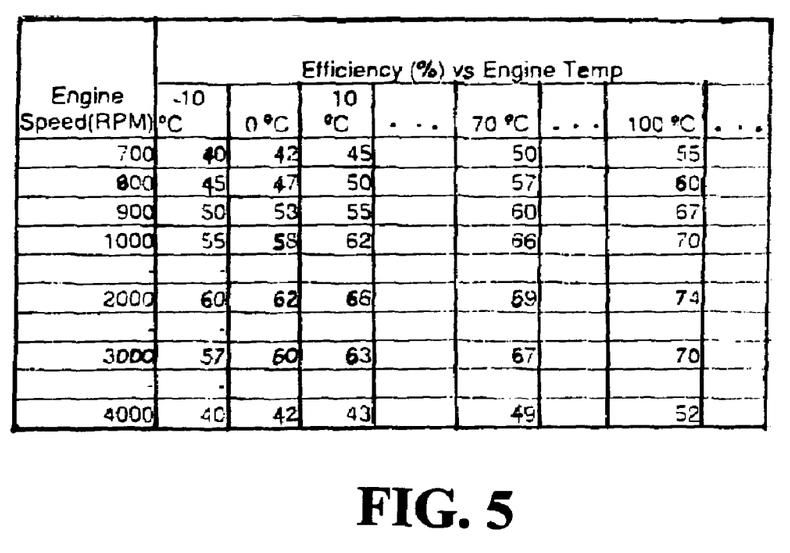
FIG. 5 illustrates an exemplary engine efficiency look-up table.

FIG. 5 shows an exemplary engine efficiency look-up table containing values of Ee expressed in percents for values of the engine speed in a range from 700 to 4000 revolutions per minute (RPM), and values of the engine temperature in a range from −10° C. to 100° C. For example, for the engine speed of 700 RPM and engine temperature −10° C., the engine efficiency Ee is equal to 40%, and for the engine speed of 2000 RPM and engine temperature 100° C., the engine efficiency Ee reaches 74%. For example, the engine efficiency look-up table may be stored in a memory associated with the control module 104.

In step 310, the indication system 300 determines the input power Pi of the engine 12 based on the engine efficiency Ee in percents read from the efficiency look-up table. A value of the input power Pi of the engine 12 may be calculated as:

$$Pi = \frac{Po \times 100}{Ee}.$$

The sensorless fuel level indication system 300 includes an engine operating time counter operating when the engine 12 operates. This counter may be used for determining a time interval T between two successive calculations of Pi (step 312).

Based on the determined input power Pi of the engine 12, the indication system determines the amount of fuel consumed during the time interval T of the engine operation (step 314). The consumed fuel amount may be determined using a look-up table containing pre-determined values of consumed fuel for various combinations of the input power Pi and time interval T. For example, the time interval T between successive calculations of Pi may be equal to 1 second.

The fuel amounts consumed during each time interval T are accumulated to determine a value of the total fuel amount consumed during the engine operation (step 316). A value of the total consumed fuel amount is reset when the fuel tank is refilled with fuel (step 318).

In step 320, the sensorless fuel level indication system 300 determines a level of fuel remaining in the fuel tank based on a difference between the fuel amount contained in the fuel tank after refilling and the total consumed fuel amount. A value representing the level of fuel remaining in the fuel tank is supplied to the fuel level indicator 112.

Since the fuel level indication system 300 determines a fuel level without sensing fuel in the fuel tank, it is able to indicate a fuel level regardless of driving conditions.

Figure 6:
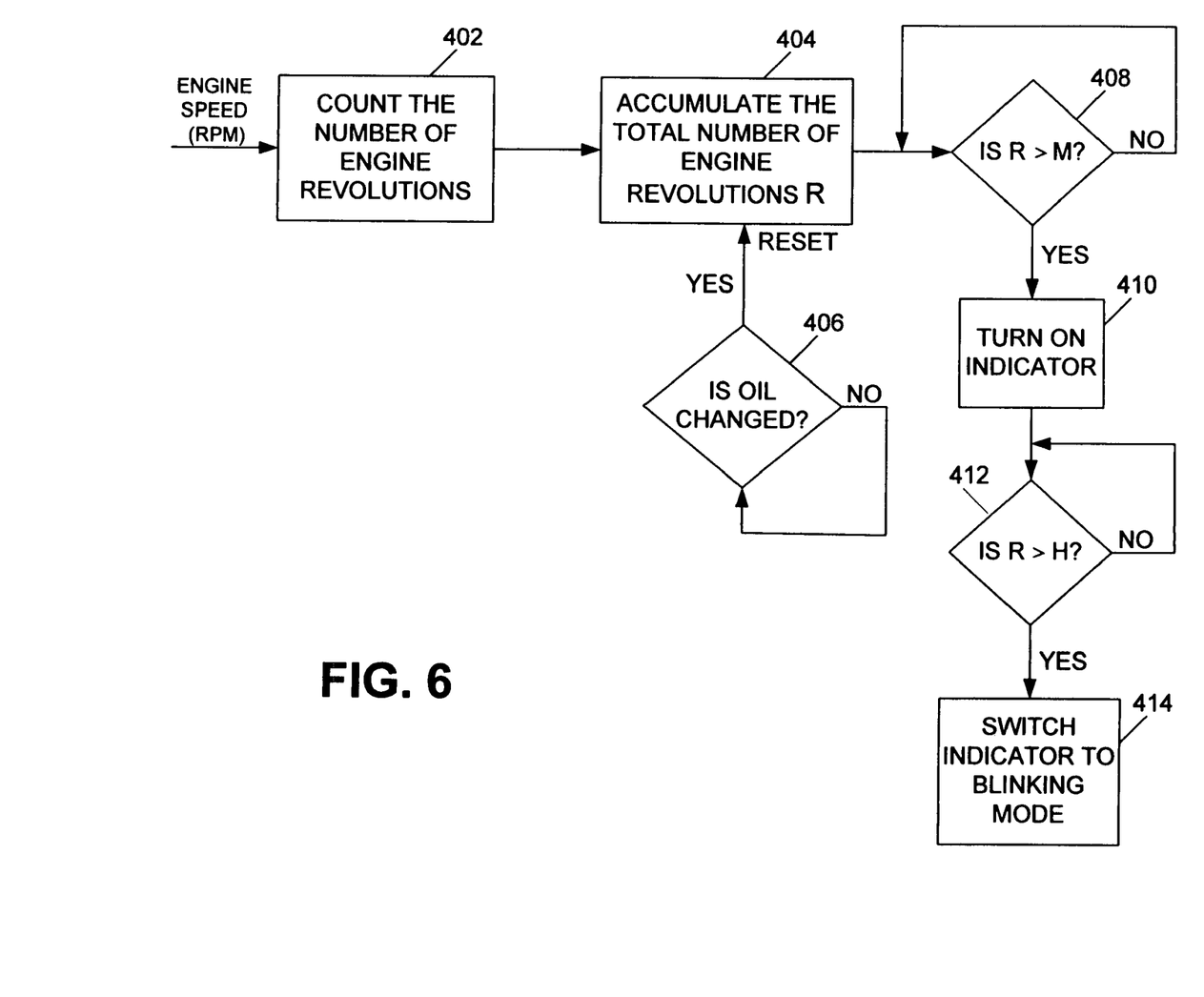
FIG. 6 is a flowchart illustrating operations of the sensorless oil change indication system of the present invention

FIG. 6 is a simplified flowchart schematically illustrating an embodiment of a sensorless oil change indication system 400 in accordance with the present invention. As indicated above, the operations of the sensorless oil change indication system 400 required to determine when oil in the engine 12 should be changed may be carried out by the control module 104.

Based on the engine speed expressed, for example, in revolutions per minute (RPM), the sensorless oil change indication system 400 counts the number of engine rotor revolutions during each period of engine operations (step 402). For example, the engine speed may be provided by the speed sensor 110. The number of engine rotor revolutions in each operational period is accumulated to determine the total number R of engine revolutions (step 404). When the engine oil is changed (step 406), the total number R of engine rotor revolutions is reset.

The total number R of engine rotor revolutions is compared with an early warning threshold number M experimentally determined to provide an early warning that the engine oil should be changed soon. For example, M may be equal to 5 million revolutions. If the total number R of engine rotor revolutions exceeds the early warning threshold number M, the sensorless oil change indication system 400 turns the oil change indicator 114 on to provide a user with an early warning that the engine oil should be changed soon (step 410).

Then, the total number R of engine rotor revolutions is compared with a warning threshold number H higher than the early warning threshold number M. The warning threshold number H is experimentally determined to provide a warning that the engine oil should be changed (step 412). For example, H may be equal to 6 million revolutions. If the total number R of engine rotor revolutions exceeds the warning threshold number H, the sensorless oil change indication system 400 switches the oil change indicator 114 to a blinking mode to warn that the engine oil should be changed (step 414).

Hence, the oil change indication system 400 provides accurate indication that the engine oil should be changed without detecting engine oil parameters.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, it is within the contemplation of the invention that the range extender 10 may be an integral portion of a hybrid electric vehicle, or is utilized as an electric power source for providing electric power to loads with substantial power consumption, such as trucks, recreational vehicles, etc.

What is claimed is:

1. A range extender for an electric vehicle, comprising:
   an engine,
   an electric generating device driven by the engine to generate electric power supplied to the vehicle, and
   a sensorless indicator for indicating operating parameters relating to a material required to operate the engine without sensing the material,
   wherein the sensorless indicator indicates a level of fuel supplied to the engine without sensing the fuel level, the fuel level is determined by calculating fuel amount consumed by the engine, and the consumed fuel amount is calculated based on input power of the engine.

2. The range extender of claim 1, wherein the input power of the engine is determined based on output power of the engine.

3. The range extender of claim 2, wherein the output power of the engine is determined based on power generated by the electric generating device.

4. The range extender of claim 3, wherein the generated power is determined based on voltage and current generated by the electric generating device.

5. The range extender of claim 2, wherein the input power of the engine is calculated as a ratio of the output power and engine efficiency.

6. The range extender of claim 5, wherein the engine efficiency is determined for a particular combination of engine temperature and engine speed.

7. The range extender of claim 3, wherein the output power of the engine is calculated as a ratio of the power generated by the electric generating device and generator efficiency.

8. The range extender of claim 7, wherein the generator efficiency is determined for a particular value of the power generated by the electric generating device.

9. The range extender of claim 1, wherein the range extender is portable and detachably connected to the vehicle.

10. The range extender of claim 9, wherein the sensorless indicator indicates a level of fuel supplied to the engine without sensing the fuel level.

11. The range extender of claim 9, wherein the sensorless indicator indicates when an engine oil should be changed without sensing properties of the engine oil.

12. The range extender of claim 10, wherein the fuel level is determined by calculating fuel amount consumed by the engine.

13. The range extender of claim 11, wherein the sensorless indicator indicates that the oil should be changed when number of engine rotor revolutions exceeds a first threshold value.

14. The range extender of claim 13, wherein the sensorless indicator provides preliminary warning that the oil should be changed soon when the number of engine rotor revolutions exceeds a second threshold value lower that the first threshold value.

15. The range extender of claim 9, wherein said electric generating device is a dynamoelectric machine coupled to the engine by a shaft.

16. The range extender of claim 15, wherein said dynamoelectric machine is configure to operate as a motor for starting the engine.

17. The range extender of claim 16, wherein in response to prescribed engine conditions said dynamoelectric machine is switched to operate as a generator driven by the engine to generate the electric energy.

18. The range extender of claim 1, further comprising a sensorless oil change indicator for indicating when engine oil should be changed, said oil change indicator providing a first indication that the oil should be changed when a number of engine rotor revolutions exceeds a first pre-set threshold value, and providing a second indication that the oil should be changed when the number of engine rotor revolutions exceeds a second pre-set threshold value.

19. The range extender of claim 18, further comprising a dynamoelectric machine coupled to the engine to generate electric energy supplied to the vehicle.

20. The range extender of claim 19, wherein the dynamoelectric machine is configured to operate as a motor for starting the engine.

21. The range extender of claim 20, wherein in response to prescribed engine conditions the dynamoelectric machine is switched to operate as a generator driven by the engine to generate the electric energy.

22. The range extender of claim 18, wherein the first pre-set threshold value is different than the second pre-set threshold value.

23. The range extender of claim 18, wherein the first indication is different than the second indication.

24. The range extender of claim 1, wherein the electric vehicle is a hybrid electric vehicle.

25. The range extender of claim 24, wherein the hybrid electric vehicle comprises a vehicle control unit and at least one electric motor powered by a battery.

26. The range extender of claim 24, wherein the hybrid electric vehicle is a series type hybrid electric vehicle.

27. The range extender of claim 1, the range extender further comprising an electronic control system for controlling operations of the engine and the electric generating device.

28. The range extender of claim 27, wherein the electronic control system further comprises a control module and an inverter/converter module.

29. The range extender of claim 1, wherein the electric generating device is a 3-phase AC electric machine.

30. The range extender of claim 1, the range extender further comprising a battery sensor that senses the voltage of a battery in the electric vehicle.

31. The range extender of claim 1, the range extender further comprising an electronic control system operatively connected to the electric vehicle.

32. The range extender of claim 3, wherein the electric vehicle is a hybrid electric vehicle.

33. The range extender of claim 32, wherein the hybrid electric vehicle comprises a vehicle control unit and at least one electric motor powered by a battery.

34. The range extender of claim 32, wherein the hybrid electric vehicle is a series type hybrid electric vehicle.

35. The range extender of claim 3, the range extender further comprising an electronic control system for controlling operations of the engine and the electric generating device.

36. The range extender of claim 35, wherein the electronic control system further comprises a control module and an inverter/converter module.

37. The range extender of claim 3, wherein the electric generating device is a 3-phase AC electric machine.

38. The range extender of claim 3, the range extender further comprising a battery sensor that senses the voltage of a battery in the electric vehicle.

39. The range extender of claim 3, the range extender further comprising an electronic control system operatively connected to the electric vehicle.

40. A method of determining a level of fuel supplied to an engine for driving an electric generator, the method comprising the steps of:
   (a) driving the generator by the engine, and
   (b) determining operating parameters relating to material required to operate the engine without sensing the material,
   wherein the step (b) includes the step of determining a level of fuel supplied to the engine, the fuel level is determined by calculating fuel amount consumed by the engine, and the consumed fuel amount is calculated based on input power of the engine.

41. The method of claim 40, wherein the input power of the engine is determined based on output power of the engine.

42. The method of claim 41, wherein the output power of the engine is determined based on power generated by the electric generating device.

43. The method of claim 42, wherein the generated power is determined based on voltage and current generated by the electric generating device.

44. The method of claim 43, wherein the input power of the engine is calculated as a ratio of the output power and engine efficiency.

45. The method of claim 44, wherein the engine efficiency is determined for a particular combination of engine temperature and engine speed.

46. The method of claim 42, wherein the output power of the engine is calculated as a ratio of the power generated by the electric generating device and generator efficiency.

47. The method of claim 46, wherein the generator efficiency is determined for a particular value of the power generated by the electric generating device.

48. The method of claim 40, further comprising the step of:
   (c) providing an output of the generator to an external battery or motor, wherein the engine and generator form a single portable unit, and are detachably connected to the external battery or motor.

49. The method of claim 48, wherein the step (b) includes the step of determining a level of fuel supplied to the engine.

50. The method of claim 48, wherein the step (b) includes the step of determining whether engine oil should be changed.

51. The method of claim 49, wherein the fuel level is determined by calculating fuel amount consumed by the engine.

52. The method of claim 50 further including the step of indicating that the engine oil should be changed when number of engine rotor revolutions exceeds a first threshold value.

53. The method of claim 52, further including the step of providing preliminary warning that the oil should be changed soon when the number of engine rotor revolutions exceeds a second threshold value lower that the first threshold value.

54. The method of claim 48, wherein said electric generator is a dynamoelectric machine coupled to the engine by a shaft.

55. The method of claim 54, further comprising the step of operating the dynamoelectric machine as a motor for starting the engine.

56. The method of claim 55, further comprising the step of switching the dynamoelectric machine to operate as a generator in response to prescribed engine conditions.

57. The method of claim 40, wherein the engine and the electric generator are operatively connected to a hybrid electric vehicle.

58. The method of claim 57, wherein the hybrid electric vehicle is a series type hybrid electric vehicle.

59. The method of claim 40, wherein the hybrid electric vehicle comprises a vehicle control unit and at least one electric motor powered by a battery.

60. The method of claim 40, further comprising controlling operations of the engine and the electric generator with an electronic control system.

61. The method of claim 60, wherein the electronic control system further comprises a control module and an inverter/converter module.

62. The method of claim 40, wherein the electric generator is a 3-phase AC electric machine.

63. The method of claim 60, further comprising sensing the voltage of a battery in a hybrid electric vehicle with a battery sensor connected to the electronic control system.

64. The method of claim 60, further comprising controlling at least one operation in a hybrid electric vehicle with the electronic control system.

65. A hybrid electric vehicle, comprising:
   a range extender engine,
   a range extender electric generating device driven by the range extender engine to generate electric power supplied to the hybrid electric vehicle, and
   a sensorless indicator for indicating operating parameters relating to a material required to operate the range extender engine without sensing the material,
   wherein the sensorless indicator indicates a level of fuel supplied to the range extender engine without sensing the fuel level, the fuel level is determined by calculating fuel amount consumed by the range extender engine, and the consumed fuel amount is calculated based on input power of the range extender engine.

66. The hybrid electric vehicle of claim 65, wherein the hybrid electric vehicle is a series type hybrid electric vehicle.

67. The hybrid electric vehicle of claim 65, wherein the hybrid electric vehicle further comprises a vehicle control unit and at least one electric motor powered by a battery.

68. The hybrid electric vehicle of claim 65, the hybrid electric vehicle further comprising an electronic control system for controlling operations of the range extender engine and the range extender electric generating device.

69. The hybrid electric vehicle of claim 68, wherein the electronic control system further comprises a control module and an inverter/converter module.

70. The hybrid electric vehicle of claim 65, wherein the range extender electric generating device is a 3-phase AC electric machine.

71. The hybrid electric vehicle of claim 65, further comprising a battery sensor that senses the voltage of a battery.

72. The hybrid electric vehicle of claim 65, further comprising a range extender electronic control system operatively connected to the hybrid electric vehicle.

73. The hybrid electric vehicle of claim 65, wherein the range extender engine and the range extender electric generating device are portable and detachably connected to the hybrid electric vehicle.

74. The hybrid electric vehicle of claim 73, wherein the range extender electric generating device is a dynamoelectric machine coupled to the range extender engine by a shaft.

75. The hybrid electric vehicle of claim 65, further comprising a sensorless oil change indicator for indicating when range extender engine oil should be changed, said oil change indicator providing a first indication that the oil should be changed when a number of range extender engine rotor revolutions exceeds a first pre-set threshold value, and providing a second indication that the oil should be changed when the number of range extender engine rotor revolutions exceeds a second pre-set threshold value.

76. The hybrid electric vehicle of claim 75, further comprising a range extender dynamoelectric machine coupled to the range extender engine to generate electric energy supplied to the hybrid electric vehicle.

77. The hybrid electric vehicle of claim 65, further comprising a fuel level indicator for determining a level of fuel supplied to the engine based on a measurement of a power generated by the range extender electric generating device.

78. The hybrid electric vehicle of claim 65, wherein the fuel level indicator is configured to operate without sensing the fuel level.

79. The hybrid electric vehicle of claim 65, wherein the hybrid electric vehicle further comprises an oil change indicator for indicating when range extender engine oil should be changed.

80. The hybrid electric vehicle of claim 79, wherein the oil change indicator is configured to operate without sensing properties of the oil.

81. The hybrid electric vehicle of claim 80, wherein the oil change indicator indicates that the oil should be changed when number of range extender engine rotor revolutions exceeds a pre-set threshold value.

82. The hybrid electric vehicle of claim 65, wherein the input power of the engine is determined based on output power of the engine.

83. The hybrid electric vehicle of claim 82, wherein the output power of the engine is determined based on power generated by the electric generating device.

84. The hybrid electric vehicle of claim 83, wherein the hybrid electric vehicle is a series type hybrid electric vehicle.

85. The hybrid electric vehicle of claim 83, wherein the hybrid electric vehicle further comprises a vehicle control unit and at least one electric motor powered by a battery.

86. The hybrid electric vehicle of claim 83, the hybrid electric vehicle further comprising an electronic control system for controlling operations of the range extender engine and the range extender electric generating device.

87. The hybrid electric vehicle of claim 86, wherein the electronic control system further comprises a control module and an inverter/converter module.

88. The hybrid electric vehicle of claim 83, wherein the range extender electric generating device is a 3-phase AC electric machine.

89. The hybrid electric vehicle of claim 83, further comprising a battery sensor that senses the voltage of a battery.

90. The hybrid electric vehicle of claim 83, further comprising a range extender electronic control system operatively connected to the hybrid electric vehicle.

91. The hybrid electric vehicle of claim 83, wherein the range extender engine and the range extender electric generating device are portable and detachably connected to the hybrid electric vehicle.

92. The hybrid electric vehicle of claim 91, wherein the range extender electric generating device is a dynamoelectric machine coupled to the range extender engine by a shaft.

93. The hybrid electric vehicle of claim 83, further comprising a sensorless oil change indicator for indicating when range extender engine oil should be changed, said oil change indicator providing a first indication that the oil should be changed when a number of range extender engine rotor revolutions exceeds a first pre-set threshold value, and providing a second indication that the oil should be changed when the number of range extender engine rotor revolutions exceeds a second pre-set threshold value.

94. The hybrid electric vehicle of claim 93, further comprising a range extender dynamoelectric machine coupled to the range extender engine to generate electric energy supplied to the hybrid electric vehicle.

95. The hybrid electric vehicle of claim 83, further comprising a fuel level indicator for determining a level of fuel supplied to the engine based on a measurement of a power generated by the range extender electric generating device.

96. The hybrid electric vehicle of claim 83, wherein the fuel level indicator is configured to operate without sensing the fuel level.

97. The hybrid electric vehicle of claim 83, wherein the hybrid electric vehicle further comprises an oil change indicator for indicating when range extender engine oil should be changed.

98. The hybrid electric vehicle of claim 97, wherein the oil change indicator is configured to operate without sensing properties of the oil.

99. The hybrid electric vehicle of claim 98, wherein the oil change indicator indicates that the oil should be changed when number of range extender engine rotor revolutions exceeds a pre-set threshold value.

100. The hybrid electric vehicle of claim 67, wherein the at least one electric motor is a traction electric motor that provides power to propel the hybrid electric vehicle.

101. The hybrid electric vehicle of claim 71, the battery sensor provides a state of charge of the battery.

* * * * *